US 11,000,936 B2

(12) United States Patent
Deleris et al.

(10) Patent No.: US 11,000,936 B2
(45) Date of Patent: May 11, 2021

(54) METHOD FOR RECOVERING MACHINING WASTE BY INPUT OF ENERGY AND MACHINING MACHINE COMPRISING A WASTE RECOVERY SYSTEM

(71) Applicant: JEDO TECHNOLOGIES, Labege (FR)

(72) Inventors: Michel Deleris, Rebigue (FR); François Cenac, Saintefoy d'Aigrefeuille (FR); Pascal Benezech, Toulouse (FR)

(73) Assignee: Jedo Technologies, Labege (FR)

( * ) Notice: Subject to any disclaimer, the term of this patent is extended or adjusted under 35 U.S.C. 154(b) by 302 days.

(21) Appl. No.: 15/022,788

(22) PCT Filed: Sep. 19, 2014

(86) PCT No.: PCT/EP2014/070036
§ 371 (c)(1),
(2) Date: Mar. 17, 2016

(87) PCT Pub. No.: WO2015/040181
PCT Pub. Date: Mar. 26, 2015

(65) Prior Publication Data
US 2016/0229030 A1    Aug. 11, 2016

(30) Foreign Application Priority Data
Sep. 20, 2013  (FR) ...................................... 1359089

(51) Int. Cl.
*B24C 3/06* (2006.01)
*B24C 9/00* (2006.01)

(52) U.S. Cl.
CPC .............. *B24C 3/065* (2013.01); *B24C 9/003* (2013.01); *Y02P 70/10* (2015.11)

(58) Field of Classification Search
CPC ................................ B24C 3/065; B24C 9/003
(Continued)

(56) References Cited

U.S. PATENT DOCUMENTS 4,375,740 A * 3/1983 Brown ...................... B24C 5/02
451/88
5,138,800 A   8/1992 Janusz
(Continued)

FOREIGN PATENT DOCUMENTS

EP         1894670      3/2008
GB          744466 A *  2/1956 ............. B24C 3/065
WO      WO93/14905      8/1993

*Primary Examiner* — Joseph J Hail
*Assistant Examiner* — J Stephen Taylor
(74) *Attorney, Agent, or Firm* — Defillo & Associates, Inc.; Evelyn A. Defillo

(57) ABSTRACT

The invention relates to implement the sealing, porosity and sweeping functions, combined. For this purpose, the present invention proposes to confine the waste and to suction the waste at the ejection head by means of a sufficiently flexible connection, such as to remain in contact with the machining area. According to an embodiment, a portable machining machine (1) operated by a pressurized jet (112) includes a waste recovery system (5), an injection head (11) which is provided with a nozzle (111) having an axis (A1) that is substantially perpendicular to the surface to be machined (4a) and which is driven by a digitally controlled two-axle guide system, the ejection head (11) being extended by an enclosure (12) to the surface area to be machined (4a). In addition, the enclosure (12) comprises a tubular portion (121) consisting of two walls (12a, 12b) which slide coaxially along the axis (A1) and a double-pivot articulation device (123). The enclosure (12) has a porous annular wall (124) in a plane substantially perpendicular to the axis (A1) of the nozzle (111), said annular wall (124) having sufficient (Continued)

resilience to keep the enclosure (12) in permanent sealing contact with the surface to be machined (4; 4*a*, 4*b*).

9 Claims, 3 Drawing Sheets

(58) Field of Classification Search
USPC .......................................................... 451/38
See application file for complete search history.

(56) References Cited

U.S. PATENT DOCUMENTS

| | | | | |
|---|---|---|---|---|
| 5,209,028 | A * | 5/1993 | McDermott | B08B 7/0092 134/7 |
| 5,319,893 | A * | 6/1994 | Hockett | B23Q 11/0866 451/102 |
| 6,273,154 | B1 * | 8/2001 | Laug | B08B 3/028 141/97 |
| 7,291,058 | B2 * | 11/2007 | Champaigne | B24C 1/00 451/38 |

* cited by examiner

METHOD FOR RECOVERING MACHINING WASTE BY INPUT OF ENERGY AND MACHINING MACHINE COMPRISING A WASTE RECOVERY SYSTEM

CROSS REFERENCE TO RELATED APPLICATION

This application is a national stage entry of PCT/ep2014/070036 filed Sep. 19, 2014, under the International Convention claiming priority over French Patent Application No. 1359089 filed Sep. 20, 2013.

TECHNICAL FIELD

The invention relates to a method for recovering waste generated during machining by means of energy input and a machining machine using energy input provided with a waste recovery system which is capable of carrying out the method.

BACKGROUND OF THE INVENTION

Surface machining can be carried out by means of shot-blasting, using a cutting tool, by a chemical action or any method for emission of solid particles (sand, salt, etcetera) and/or fluid particles (in particular water). More particularly, the machining of large panel surfaces can be carried out using two types of system: a shaping tool, used by following the processed surface, or an energy input system, used without the need to follow the processed surface. This last type is advantageously implemented using machines for input of impacting energy, such as the jet of abrasive material under a high water pressure, which can be up to several thousand bar. Such machines referred to as abrasive water jet machines can carry out cutting operations, correction operations, repairs or cleaning operations (pickling, polishing, deburring, etcetera) of the panel surfaces.

Abrasive water jet machining is based on the principle of removing material by means of mechanical action of the jet of water charged with abrasive particles and propelled through a nozzle with which a discharge head is provided. An advantage of the machining machines using energy input involves the negligible influence of the distance or the inclination between the discharge nozzle and the surface to be processed. It is thus possible to machine difficult surfaces by means of relative movement along two axes between the machine and the surface to be processed, whilst the distance between the discharge head and the processed surface varies in accordance with the precise geometry of the panel which is in fact known only to within a tolerance.

The processed panels may have curves, in particular the panels of composite material which are used in the aeronautical industry, and thus form difficult surfaces.

In order to carry out the machining on such surfaces, portable abrasive water jet machines have been more particularly developed. Using a two-axis numerical control of the discharge head which can be moved on a gantry which is capable of moving on sliding members, these machines enable the jet to successively cross—with all the precision required—surfaces having a predetermined dimension. This type of machine therefore enables a machining operation which is adapted to the curved surface of the panels to be carried out. The erosion of the material generates locally, in the region of the impact of the jet on the processed surface, water which is charged with abrasive particles, particles which are extracted from the surface and dust which forms waste. This raises the question of efficient discharge of this waste in all the configurations since a machine using energy input is capable of working on any surface, whether it be vertical or upper ("ceiling" type).

In order to enable the discharge of waste, numerous patents propose providing the discharge head with a connection cap with a suction pump. For example, the patent document EP 1 894 670 describes a tool carrier which is provided in particular with a suction system for waste, produced during a numerically controlled automatic type machining operation, and a conical suction cap. This cap may be constituted by a brush which is composed of rows of flexible fibers or a rigid or semi-rigid component which may be provided with drilling holes for the introduction of air.

In the patent document EP 1 854 383, a suction device of an abrasion device comprises, inter alia, an inclined connection means which is connected to a vacuum source and a cylindrical resilient end section of the "bellows" type.

However, the cap or bellows described in these documents do not enable permanent contact to be maintained with the surface to be processed, in particular when this surface is difficult, when a movement in two axes is carried out: the "sealing" with this surface is not ensured and the air originating from the outer side can pass between these connection means of the prior art and the surface.

In addition to the sealing, these connection means do not ensure the confinement of the waste which may be discharged outside the boundaries during the movement of the movable discharge head: the means of the prior art do not define porosity which is capable of preventing waste from being discharged whilst allowing suction air to enter. The confinement is not complied with.

Furthermore, the means of the prior art do not carry out a reliable sweeping operation of the machined surfaces since, during the movement of the discharge head, waste which is not drawn in does not always remain confined in the machining surface as a result of the lack of sealing and porosity.

SUMMARY OF THE INVENTION

An object of the invention is to overcome the inadequacies of the prior art, that is to say, to carry out in combination the functions of sealing, porosity and sweeping.

To this end, the present invention proposes confining the waste and drawing in this waste in the region of the discharge head using a connection which is adaptable and sufficiently flexible to remain in contact with the machining zone, whilst allowing the air to pass through this connection.

More specifically, the present invention relates to a method for recovering waste generated during machining of a surface using a jet of pressurized material which originates from a nozzle having an axis which is substantially perpendicular to the surface to be machined. The nozzle is provided in a discharge head of a machining machine which is driven along two axes in order to process the surface having a shape which may be difficult. At least one chamber extends the discharge head as far as the surface to be machined and delimits an internal space. A suction of air is carried out in the internal space in order to discharge the waste generated.

This is because it is possible to arrange a plurality of concentric chambers which are pressed onto the surface to be processed. For example, the first chamber performs a rough recovery of the waste, and the second finishes the work and dries the surface.

In this method, a movability of the chamber or an assembly of concentric chambers is produced along the axis of the nozzle in combination with an articulation in order to adapt to the curvature of the machined surface with sufficient resilience, whilst taking up the relative movements of the discharge head relative to the machined surface and maintaining substantially permanent sealed contact in order to produce a confinement of the waste in the internal space and a sweeping of the waste during the movement thereof without the waste being able to leave the internal space.

Under the conditions of machining difficult surfaces, the method according to the invention adapts directly to the variation of distance (cutting depth) between the discharge head and the machined surface and optimizes the suction of the waste via this adaptation. This enables the functions of sealing, porosity and sweeping to be retained, regardless of this variable cutting depth, given that the machining quality—that is to say, the machined depth—is affected neither by the variation of the cutting depth nor by the inclination of the jet.

In this manner, the movability of the chamber along the axis of the nozzle—in accordance with the configuration of the machined surface—enables the movement of the machine along the "Z" axis to be dispensed with so that the movement of the machine may be limited to a two-axis movement "X-Y". The method according to the invention is therefore compatible with a simplified control and system for movement of the machine. Furthermore, this method also adapts automatically to the curvature of the machined surface without requiring the provision of inclination means.

According to advantageous embodiments:

the suction of air is carried out from the outer side toward the inner side of the internal space via at least one porous confinement wall which has sufficient resilience to form the articulation for adaptation to the curvature of the machined surface;

alternatively or additionally, the suction of air is carried out via a pressurized air inlet in the internal space in order to guide the air which carries the waste to a discharge outlet which is located opposite the inlet; this solution enables the air to be fluidified, enables the suction to be facilitated and therefore enables the disruptions of the occurrences of air turbulence and the waste to be reduced on the jet;

an electromagnetic membrane is formed in the internal space so that the air which is charged with waste does not disrupt the jet of abrasive material.

Preferably, the or a porous confinement wall is arranged at the end of the chamber so as to move directly into resilient contact with the machined surface.

According to a specific embodiment, the chamber is composed of a tubular portion, which is generally of cylindrical shape formed by means of revolution and/or of conical shape with a central axis of symmetry which substantially coincides with the axis of the nozzle and a waste collector which is connected to the tubular portion via the articulation. Advantageously, the articulation is formed by at least one translation and/or rotation in accordance with the degree of complexity of the shape of the surface to be machined.

The invention also relates to a machining machine using energy input comprising a waste recovery system which is capable of implementing the method above. The machine comprises a discharge head which is provided with a nozzle having an axis which is substantially perpendicular to the surface to be machined and which is driven by a guiding system having two axes. The discharge head is extended by at least one chamber as far as the surface to be machined, the chamber being connected to air pumping means in order to recover the waste originating from the machining operation.

In this system, the chamber comprises a tubular portion which is provided with length variation means in order to adapt the chamber to the distance between the discharge head and the surface to be machined. The chamber also comprises a means for articulation in terms of rotation and/or translation in order to adapt the chamber to the variable angular inclinations of the surface to be machined.

Furthermore, the chamber has air suction means in order to discharge the waste via the air pumping means.

According to preferred embodiments:

the air suction means are constituted by at least one annular wall of porous material in a plane substantially perpendicular to the axis of the nozzle. This annular wall has sufficient resilience to act as a main or complementary articulation while maintaining the chamber in contact with the surface to be machined in order to produce a permanent sealed contact of the chamber on this surface;

alternatively or additionally, the air suction means are constituted by means for injection of air which originates from a compressor so that the air is directed towards air outlet means which communicate with the waste suction pipe;

the chamber comprises a waste collector which is mounted so as to be connected to the tubular portion via the dual-pivot articulation means;

the injection means comprise an aperture for injection of air compressed by a connected compressor, which is arranged in the collector so that the air is directed towards the air outlet means which comprise an air outlet aperture which is located opposite the injection aperture, the outlet aperture communicating with the waste suction pipe;

the articulation means may be selected, depending on the complexity of the surface to be machined, from a pivot, a ball-bearing or dual-pivot ball and socket joint, in particular a ball and socket joint with two concentric rings which have perpendicular rotation axes which are defined in a plane which is substantially perpendicular to the axis of the nozzle, and a ball and socket joint which is connected to an additional sliding member which can move perpendicularly to the axis of the nozzle; this last combination is in particular intended for very complex shapes such as omega-shaped reinforcements;

the length variation means are constituted by two walls which slide coaxially along the axis of the nozzle;

the sliding walls are connected to each other via ball or needle type bearings;

the air pumping means comprise a suction pipe which is connected to a pump;

the or an annular wall is arranged at the end of the chamber so that this wall is located either directly in contact with the surface to be machined or in contact with this surface via a flexible lip;

the dual-pivot articulation means is constituted by two concentric rings which have perpendicular rotation axes which are defined in a plane which is substantially perpendicular to the axis of the nozzle;

the porous material is an open cellular material, in particular a carbon foam.

BRIEF DESCRIPTION OF THE FIGURES

Other data, features and advantages of the present invention will be appreciated from a reading of the following non-limiting description, with reference to the connected Figures which illustrate, respectively.

DETAILED DESCRIPTION OF THE INVENTION

Figure 1:
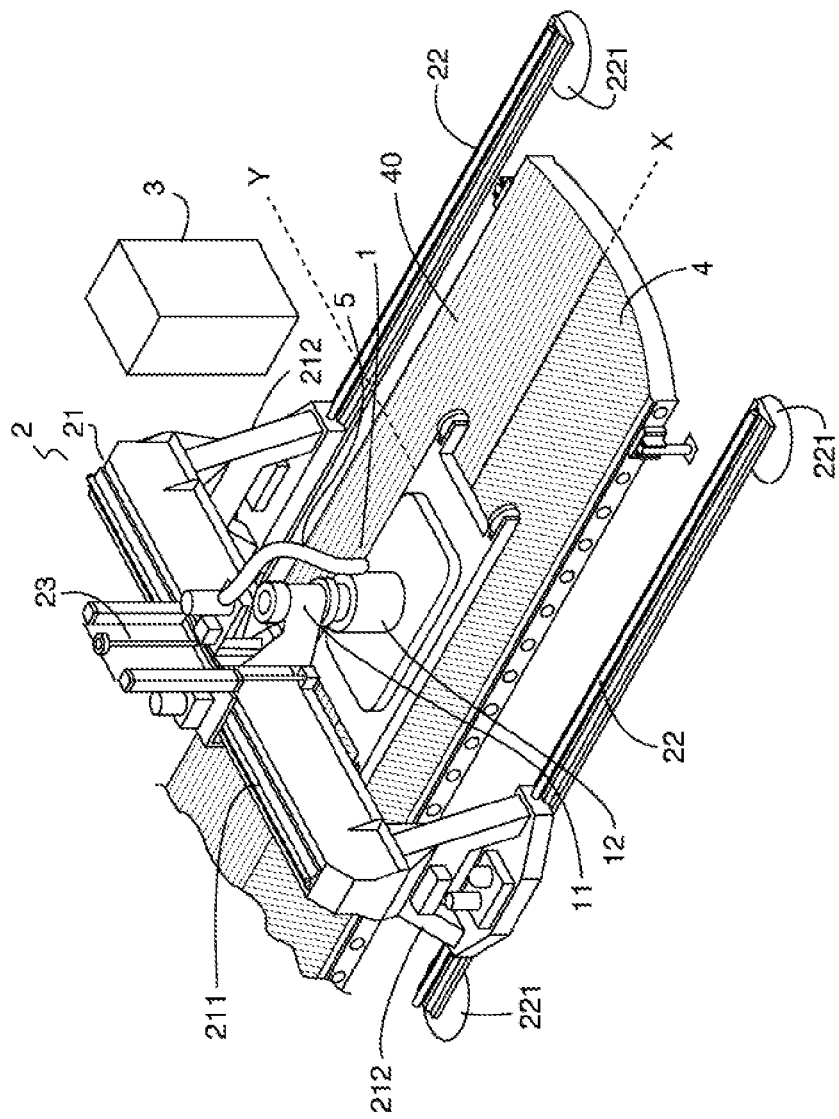
FIG. 1 is a general schematic perspective view of an example of a portable machine according to the invention with the numerically controlled two-axis guiding system thereof.

With reference to the general schematic view of FIG. 1, an example of a portable machining machine 1 using a pressurized jet according to the invention is driven by a guiding system 2 having two axes X, Y with numerical control 3, in order to machine a curved surface 4, an aircraft fuselage portion of composite material in the example illustrated.

The guiding system 2 comprises a gantry 21 which is composed of a transverse beam 211 which is supported at the end by feet 212 which move in translation —perpendicularly to the beam 211—on sliding members 22 via rollers (not illustrated), the sliding members 22 being maintained via suction pads 221 which are applied to the surface 4. The machine 1 is fixed via the discharge head 11 thereof to a chassis 23 which is capable of moving on the beam 211 via bearings (not illustrated).

The discharge head 11 is extended by a chamber 12 which extends as far as the machined surface 4. This chamber 12 is connected to a suction pipe 5 which is connected to an air pump (not illustrated) in order to constitute a system for recovering waste originating from the machining operation.

Figure 2A:
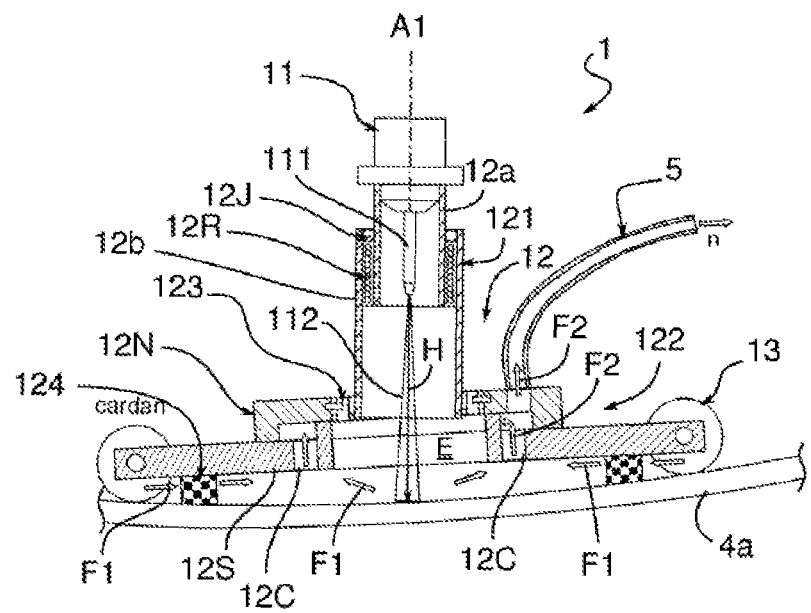
FIGS. 2a and 2b are vertical sectioned views of the portable machine of FIG. 1 with two concave and convex-curvature profiles of the surface to be machined, respectively.
Figure 2B:
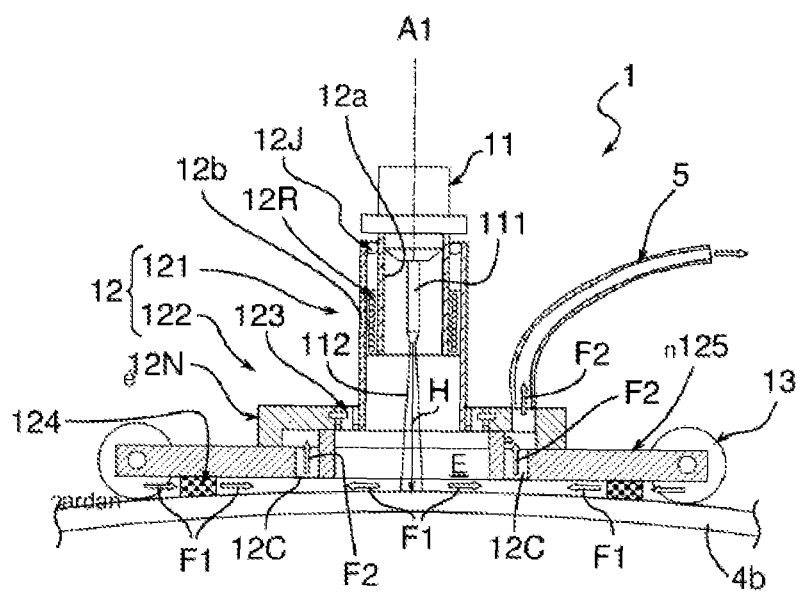

More specifically, vertical sections—that is to say, substantially perpendicular to the machined surface 4—of the portable machine 1 are illustrated in FIGS. 2a and 2b, respectively, when the machined surface 4 has a concave-curvature profile 4a and convex-curvature profile 4b.

The portable machining machine 1 comprises the discharge head 11 for pressurized abrasive material, for example, sand under water pressure, and the chamber 12 mounted on wheels 13. The head 11 is provided with a nozzle 111 for discharging a jet of abrasive pressurized water 112 having an axis A1 which is substantially perpendicular to the machined surface 4a or 4b.

More specifically, the chamber 12 comprises a tubular portion 121 and a collector 122. The tubular portion 121 is constituted by two walls 12a and 12b which slide coaxially one on the other along the axis A1 of the nozzle 111 via ball-bearings 12R, the connection being protected by a joint 12J. The internal wall 12a is fixedly joined to the discharge head 11 and the other external wall 12b is connected to the collector 122 via a dual-pivot ball and socket joint 123. This ball and socket joint 123 enables adaptation of the chamber 12, which remains substantially parallel with itself during the sweeping of the machined surface, whilst the head and the discharge nozzle remain substantially mutually parallel. A dual-pivot type ball and socket joint will be described in a detailed manner with reference to FIG. 3.

As a result of the movability of the external wall 12b along the axis A1—perpendicularly to the surface 4a or 4b to be processed—it is possible to adapt the position of the discharge head 11, that is to say, the cutting depth "H" of the jet 112, to the machined surface. Thus, by comparison between the FIGS. 2a and 2b, it appears that this cutting depth "H" is substantially increased when the surface changes from a convex curvature 4b (FIG. 2b) to a concave curvature 4a (FIG. 2a).

Furthermore, the chamber 12 has, in a plane substantially perpendicular to the axis A1 of the nozzle 111, a wall in the form of a porous annular confinement strip 124, in this instance of carbon foam, which is fixedly joined to the base plate 12S of the collector 122. This annular strip 124 is thus arranged between the collector 122 and the surface 4a, 4b. This strip 124 has sufficient resilience to remain in sealed contact with the machined surface 4a or 4b so that a permanent sealed contact remains established between the chamber 12 and this surface 4a, 4b.

A suction of air is first produced approximately parallel with the surface 4a, 4b (arrows F1) by means of pumping in order to discharge the waste generated in the internal space "E" delimited by this collector 122 and the annular strip 124, during the machining operation. The permanent sealed contact between the annular strip 124 and the surface 4a, 4b produces a sweeping of this waste during the movement in the machined surface. The suction of air (arrows F1 and F2) is carried out by means of pressure reduction from the outer side to the internal space "E" via the porous strip 124, without the waste being able to be discharged from this space.

Then, the air and the waste which is transported are discharged substantially perpendicularly with respect to the machined surface 4a, 4b (arrows F2) via the suction pipe 5 which is mounted on the discharge pump (not illustrated) via a tank 12N which includes an internal circular channel 12C. The tank 12N is fixedly joined to the base plate 12S in order to constitute the collector 122.

Alternatively, the annular strip 124 may be provided with a lip of flexible material in order to improve the sweeping. More generally, the annular strip may be integrated in the chamber 12 and the lip of flexible material is thus advantageously provided in order to carry out effective sweeping.

Figure 3:
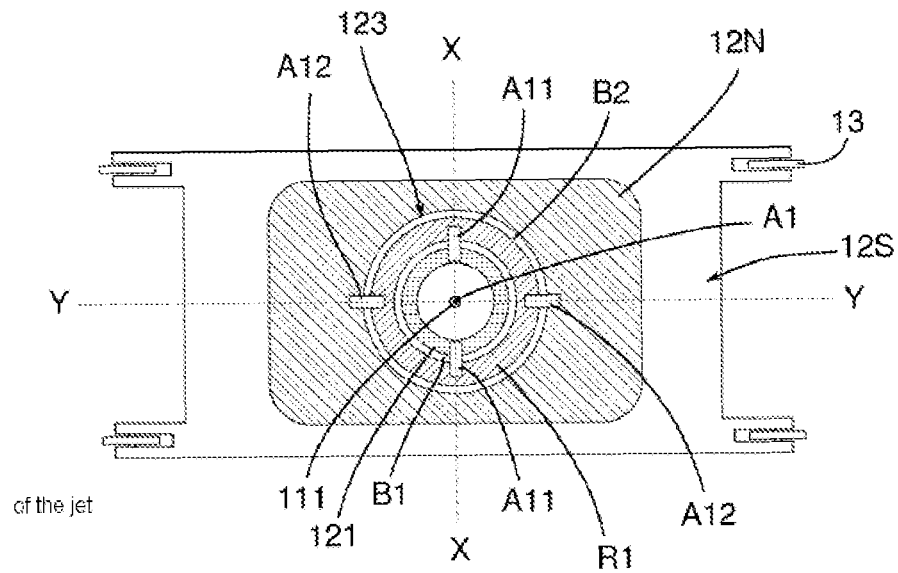
FIG. 3 is a schematic upper view of the articulation of the pivot type between the tubular portion and the collector of the chamber of the portable machine in a plane substantially perpendicular to the axis of the nozzle of the machine.

The upper view of FIG. 3 illustrates the dual-pivot ball and socket joint 123 which forms an articulation between the tubular portion 121 and the tank 12N. The ball and socket joint 123 is formed by two concentric rings B1 and B2 which are separated by a cardan washer 12R. The rings B1 and B2 can pivot about the axes X and Y by means of assembly on pivots A11 and A12, respectively, the axes X, Y and the shafts A11, A12 being perpendicular to each other and to the axis A1 of the discharge nozzle 111. The ring B1 is fixedly joined to the tubular portion 121 and the ring B2 of the tank 12N.

Under these conditions, the external wall 12b and therefore the tubular portion 121 and the discharge head 11 may form—by means of combined pivoting about the axes X and Y—an angle of inclination which is adapted to the curvature of the machined surface 4 and the collector 122, whilst remaining parallel with the axis A1.

Figure 4:
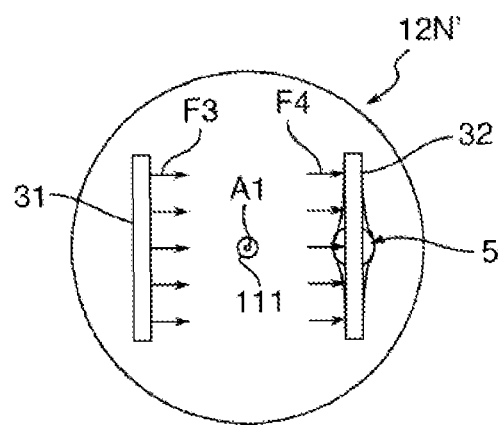
FIG. 4 is a sectioned view of the collector of a production variant which comprises a system of injection apertures and air outlet apertures which are located opposite.

The sectioned view of FIG. 4 illustrates a tank 12N' of a production variant of an example of a portable machine according to the invention. This tank 12N' comprises, in addition to the tank 12N' described above, an aperture 31 for injection of compressed air (arrows F3) and an air outlet aperture 32 (arrows F4). The air injected into the aperture 31 is compressed by a connected compressor (not illustrated).

More specifically, the aperture 31 is arranged in the collector 122' so that the air is directed (arrows F3) toward the air outlet aperture 32 which is located opposite the injection aperture 31, the outlet aperture 32 communicating with the waste suction pipe 5. Advantageously, the outlet aperture 32 has—parallel with the axis A1 of the nozzle 111—the shape of a funnel which is connected to the suction pipe 5 without creating turbulence.

The invention is not limited to the embodiments described and illustrated. For example, the annular strip 124 of porous material may be arranged in the chamber 12 of the example illustrated in FIGS. 2a and 2b, in particular between the base plate 12S and the tank 12N.

Furthermore, it is possible to integrate a virtual electromagnetic membrane in the chamber of the machine, in particular in the tubular portion, in order to fluidify the air and the waste in order to also reduce the risks of disruption of the jet of water. Such a membrane is generated by an appropriate magnetic field. Alternatively, a real membrane could also be fitted with a cut-out and a suitable porosity.

The invention can be used for any energy input machine, in particular but not exclusively for portable abrasive water jet machines. Furthermore, the embodiments extend directly to machines having a plurality of concentric chambers.

The invention claimed is:

1. A portable machining machine (1) using an energy input (112) comprising:
   a waste suction pipe (5);
   a discharge head (11) having a nozzle (111) having an axis (A1), which is perpendicular to the surface (4; 4a, 4b) to be machined;
   a guide device (2) connected to the discharge head, the guide device comprising a gantry (22) having two perpendicular axes (X,Y), and including a transversal beam (211) supported by feet (212) moving on sliding members (22) maintained on the surface to be machined (4, 4a, 4b), the feet (212) being perpendicular to the transversal beam (211), said two perpendicular axes (X,Y) being in a plane which is perpendicular to the axis (A1) of the nozzle (111);
   at least one chamber mounted on wheels having a first end connected to the discharge head and a second end connected to the surface (4; 4a, 4b) to be machined, the waste suction pipe is connected to the chamber;
   an air suction pump connected to the waste suction pipe, the air suction pump suctions the waste from the chamber through the suction pipe (5);
   the at least one chamber delimits an internal space (E) carrying an air suctioned by the air suction pump;
   wherein each one of the at least one chamber includes a tubular portion (121) and a collector (122), the tubular portion includes a length adjusting device having an internal wall and an external wall, which slides one on the other along the axis (A1) of the nozzle (111), the internal wall is fixed to the discharge head and the external wall is connected to the collector (122) via a central dual-pivot device (123) adjusting the length of the chamber (12) to the variable angular inclinations and curvatures of the surface (4; 4a, 4b) to be machined.

2. The machining machine as claimed in claim 1, wherein the chamber includes a strip (124) made of a resilient material is connected to a bottom end of the collector.

3. The machining machine as claimed in claim 2, wherein the resilient strip (124) is arranged at the end of the chamber (12) so that the said resilient strip (124) is located either directly in contact with the surface (4; 4a, 4b) to be machined or in contact with the surface (4; 4a, 4b) via a flexible lip.

4. The machining machine as claimed in claim 2, wherein the resilient material is a carbon foam.

5. The machining machine as claimed in claim 1, wherein the collector (122) includes an injection device including an aperture (31) to inject a compressed air produced by a connected compressor.

6. The machining machine as claimed in claim 1, wherein the dual-pivot device is selected from a group consisting of a pivot, a ball-bearing, a dual-pivot ball, a socket joint, and a ball and socket joint.

7. The machining machine as claimed in claim 1, wherein the dual-pivot device is a ball and socket joint having two concentric rings (B1, B2), which have perpendicular rotation axes (X,Y), which are defined in a plane, which is substantially perpendicular to the axis (A1) of the nozzle (111).

8. The machining machine as claimed in claim 1, wherein the sliding walls (12a, 12b) are connected to each other via ball or needle type bearings (12R).

9. A portable machining machine (1) using an energy input (112) comprising:
   a waste suction pipe (5);
   a discharge head (11) having a nozzle (111) having an axis (A1), which is perpendicular to the surface (4; 4a, 4b) to be machined;
   a guide device (2) connected to the discharge head, the guide device comprising a gantry (22) having two perpendicular axes (X,Y), and including a transversal beam (211) supported by feet (212) moving on sliding members (22) maintained on the surface to be machined (4, 4a, 4b), the feet (212) being perpendicular to the transversal beam (211), said two perpendicular axes (X,Y) being in a plane which is perpendicular to the axis (A1) of the nozzle (111);
   at least one chamber having a first end connected to the discharge head and a second end connected to the surface (4; 4a, 4b) to be machined, the waste suction pipe is connected to the chamber;
   an air suction pump connected to the waste suction pipe, the air suction pump suctions the waste from the chamber through the suction pipe (5);
   the at least one chamber delimits an internal space (E), an air suctioned by the air suction pump;
   wherein each one of the at least one chamber includes the tubular portion (121) and a collector (122), the tubular portion includes a length adjusting device having an internal wall and an external wall, which slides one on the other along the axis (A1) of the nozzle (111), the internal wall is fixed to the discharge head and the external wall is connected to the collector (122) via a central dual-pivot joint device (123) having a dual-pivot ball and socket joint adjusting the length of the chamber (12) to the variable angular inclinations and curvatures of the surface (4; 4a, 4b) to be machined; and
   wherein the chamber includes at least one annular confinement wall forming a strip (124) on a bottom end, the at least one annular confinement wall (124) is made of a porous material, the at least one annular confinement wall (124) is perpendicular to the axis (A1) of the nozzle (111), the annular wall has sufficient resilience to produce a permanently sealed contact of the chamber on the surface.

* * * * *